Patented Oct. 15, 1946

2,409,333

UNITED STATES PATENT OFFICE 2,409,333

LUBRICANT AND METHOD OF PREPARING SAME

Donald L. Wright, Westfield, and Charles W. Bohmer, Jr., Elizabeth, N. J., assignors to Standard Oil Development Company, a corporation of Delaware No Drawing. Application September 16, 1943, Serial No. 502,640

4 Claims. (Cl. 252—59)

This invention relates to chemically resistant lubricants, and more particularly to nitration-resistant lubricants.

This application is a continuation-in-part of application Serial No. 393,370, filed May 14, 1941, now U. S. Patent No. 2,335,331, issued November 30, 1943, which relates broadly to the production of a nitration-resistant lubricant of proper consistency by blending together a major proportion of mineral white oil, a highly refined petroleum wax and a substantially saturated linear type aliphatic hydrocarbon polymer having a molecular weight of about 5,000 to 100,000, or higher. The chief feature of the present continuation-in-part application is that in place of hydrocarbon polymers in the above described compositions, one may use high molecular weight oxygen-containing viscosity-increasing linear aliphatic polymers, preferably having a molecular weight of at least 1,000. One such oxygen-containing thickener is a high molecular weight polymer of an oxygen-containing compound having the group

in its molecular structure. Such additives include polymers of vinyl ethers having the general formula

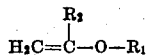

in which $R_1$ is an unsubstituted or substituted aliphatic, aromatic, or hydroaromatic radical, and $R_2$ is a hydrogen atom or a substituted or unsubstituted aliphatic radical e. g., vinyl oleyl ether, vinyl isobutenyl ether, vinyl meta-cresyl ether, vinyl cyclohexyl ether, vinyl octadecyl ether, vinyl chlorcethyl ether, vinyl amino propyl ether, α-ethylvinyl isohexyl ether, α-chloromethyl vinyl lauryl ether, etc.; polymers of vinyl esters having the general formula $$(CH_2=CR_2—OOC)n—R_1$$

in which $R_1$ and $R_2$ are as above and $n$ is an integer having a value of 1 or more, e. g., vinyl stearate, vinyl ester of acids obtained by oxidation of paraffin wax, vinyl chlorpropionate, vinyl aminopalmitate, vinyl adipate, vinyl citrate, etc.; polymers of acrylic acid esters having the general formula, $R—OOC—C(X)=CH_2$, in which R is an unsubstituted or substituted aliphatic, aromatic, or hydroaromatic group, preferably containing at least 10 carbon atoms, and X is a H or a halogen atom, or a $CH_3$ group or a $C_2H_5$ group, e. g. lauryl acrylate, cetyl acrylate, octa- decyl acrylate, amylphenyl methacrylate, isoheptyl cyclohexyl chloroacrylate, chlorodecyl methacrylate, etc., especially such polyacrylic esters having a molecular weight of about 10,000 to about 50,000 or more.

Another case of high molecular weight, oxygen-containing substances which can be used for the purposes of this invention is the class of condensation products or polyesters of substituted fatty acids having the general formula,

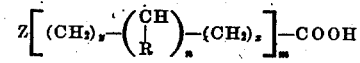

in which R is a H atom or an unsubstituted or substituted aliphatic, aromatic, or hydroaromatic group, $x$ and $y$ may equal 0 or any integer provided that $x+y$ equals at least 5, and where $n$ is 0 or an integer and $m$ is a whole number and Z is a functional group which has one replaceable hydrogen atom, Z being capable of esterifying a carboxyl group. Some of these polyesters are described in U. S. Patent 2,147,647, and are typified by the polyester having a molecular weight of about 14,000 obtained by polyesterification of 12-hydroxy stearic acid in the presence of a small amount of adipic acid.

One may use still other thickeners such as various isobutylene co-polymers of high molecular weight, e. g., 5,000 to 50,000 or more, such as the almost saturated isobutylene-butadiene co-polymer made at temperatures below 0° C., e. g. —70° C., —80° C., etc., using as catalyst a solution of a Friedel-Craft halide dissolved in an alkyl halide solvent, e. g., $AlCl_3$ in methyl chloride, and preferably in the presence of liquefied propane, ethane, ethylene or other inert gas as refrigerant-diluent. Another suitable co-polymer thickener is the oil-soluble, substantially saturated isobutylene-ethylene co-polymer made at 100–400° C., using high pressure, e. g., 500, 1,000, or 2,000 atmospheres, preferably with addition of a small amount of oxygen. Other types of substantially fully saturated polymeric hydrocarbon materials may be used such as substantially completely hydrogenated rubber. In general, the various polymer thickeners to be used, according to this invention, should have an iodine number of not more than about 20 and preferably not more than 10, those having an iodine number of less than 1 or 2 being the most preferable.

Although the invention has been particularly emphasized as valuable as a nitration-resistant lubricant, it is intended that this lubricant be used in many industrial applications where chemical resistance generally is required, such as resistance to various acids other than nitric, e. g., sulfuric, hydrochloric, etc., strong alkalies, such as caustic soda or potash, or various oxidizing and reducing agents or other chemical influences.

To illustrate the application of the invention using a high molecular weight oxygen-containing polymer, the following table of examples is given, in this instance the polymerized lauryl alpha methacrylate.

|  | Example No. | | | | |
| --- | --- | --- | --- | --- | --- |
|  | 24 | 25 | 26 | 27 | 28 |
| Polymerized lauryl alpha methacrylate (about 10,000 average mol. wt.) | 10 | 7 | 15 | 10 | 15 |
| Mineral white oil (vis. about 300–400 sec./100° F.) | 70 | 65 |  | 80 |  |
| Petrolatum (light colored and highly refined) | 15 | 15 | 85 |  | 75 |
| Paraffin wax (M. Pt. about 125° F.) | 5 | 3 |  | 5 |  |
| Graphite |  | 10 |  | 5 | 10 |

Although preferred proportions have been given for the amounts of mineral white oil, light petrolatum and paraffin wax, it should be understood that in the broader aspects of this invention, it is not necessary to use all three of those constituents, provided the proper texture or plasticity can be obtained with any one (as may be done frequently with petrolatum), or with any two of such ingredients (as with a mixture of mineral white oil and paraffin wax, or a mixture of mineral white oil and petrolatum). In the appended claims the expression "texture-controlling petroleum hydrocarbon mixture" is intended to mean any one or two or all three of those constituents. In general, the proportions of those constituents are preferably chosen between the approximate limits of 50 to 85% by weight of mineral white oil, 10 to 50% by weight of petrolatum and 0 to 10% by weight of paraffin wax.

The proportions of oxygen-containing polymer used with advantage may vary within the limits of 0.3% and 50% by weight of the lubricant to be improved. Good results are generally obtained when the amount of polymer is selected in accordance with its molecular weight as indicated in the table below:

| Average mol. wt. of polymer | Percent by weight |
| --- | --- |
| 5,000 | 10–50 |
| 12,000 | 8–20 |
| 30,000 | 7–15 |
| 80,000 | 5–10 |
| 150,000 | 0.3–2 |

Thus, lubricants having highly desirable properties may be composed of the constituents and in the proportions listed below:

| | Percent |
| --- | --- |
| Polymerized acrylic acid ester | 10–15 |
| Mineral white oil | 65–80 |
| Light petrolatum | 15–30 |
| Paraffin wax | 0–10 |

The following test shows the nitration-resistant characteristic of polymerized lauryl methacrylate: The dry plastic polymer, estimated to have an average molecular weight of about 30,000, was dissolved in 10% concentration in an artificial petroleum jelly, such as used in the test shown in Table 1 of application Serial No. 393,370, now U. S. Patent No. 2,335,331, issued November 30, 1943. The blend was made by heating the petroleum jelly to its melting point of 60° C., and stirring the polymer which dissolves readily. 6 grams of the resultant blend were then mixed with 4 grams of fuming nitric acid at 60° C. No fuming occurred and there was only a 15–20° C. temperature rise, which is within the normal range for materials which are satisfactory for lubricating nitric acid pump packing. This is very surprising, because most chemists would expect that a chemical compound containing oxygen, especially in an ester linkage, would react vigorously, if not actually violently, with nitric acid. Although the reason is not understood for the chemical inertness of these high molecular weight oxygen-containing polymers, it is believed that the linear structure and relatively extremely high molecular weight, compared to esters of only monomeric or dimeric nature as having a molecular weight in the range up to about 500, probably have the tendency to reduce the relative sensitivity of the oxygen-containing group in the very large molecule. When subjected to the bomb explosion test described in connection with Table 1 of our copending application Serial No. 393,370, now U. S. Patent No. 2,335,331, issued November 30, 1943, the lubricants prepared according to the present invention do not crush the lead supporting block more than 0.1 inch when tested with concentrated nitric acid alone and a No. 8 detonating cap.

The compositions of the present invention may also be used for the manufacture of packing materials suitable for pumps handling nitrating acids. Such packing material may, for instance, consist of acid-resistant Blue African asbestos impregnated with a nitration-resistant lubricant comprising a substantially saturated aliphatic oxygen-containing polymer having a molecular weight of at least about 5,000.

It is not intended that this invention be limited to any of the particular examples which have been given for the sake of illustration nor unnecessarily by any theories as to the operation of the invention, but only by the appended claims in which it is intended to claim all novelty inherent in the invention as broadly as the prior art permits.

We claim:

1. A chemically resistant lubricant having approximately the following composition in percent by weight:

| | Percent |
| --- | --- |
| Mineral white oil | 50–85 |
| Petrolatum (light oil-free) | 10–50 |
| Paraffin wax | 0–10 | and an amount of a viscosity-increasing linear polymer of an oxygen-containing aliphatic compound, said amount being selected according to the average molecular weight of said polymer, indicated by the following table:

| Average mol. wt. of polymer | Percent by weight |
| --- | --- |
| 5,000 | 10–50 |
| 12,000 | 8–20 |
| 30,000 | 7–15 |
| 80,000 | 5–10 |
| 150,000 | 0.3–2 |

2. Lubricant according to claim 1 in which the mathematical product of the percent of polymer times the average molecular weight thereof is at least 50,000.

3. Lubricant according to claim 1 which when subjected to the bomb explosion test described, does not crush the lead supporting block more than 0.1 inch when tested with concentrated nitric acid alone and a No. 8 detonating cap.

4. A nitration-resistant lubricant having approximately the following composition in percent by weight:

|  | Percent |
|---|---|
| Polymerized acrylic acid ester | 10–15 |
| Mineral white oil | 65–80 |
| Light petrolatum | 15–30 |
| Paraffin wax | 0–10 |

DONALD L. WRIGHT.
CHARLES W. BOHMER, Jr.